UNITED STATES PATENT OFFICE.

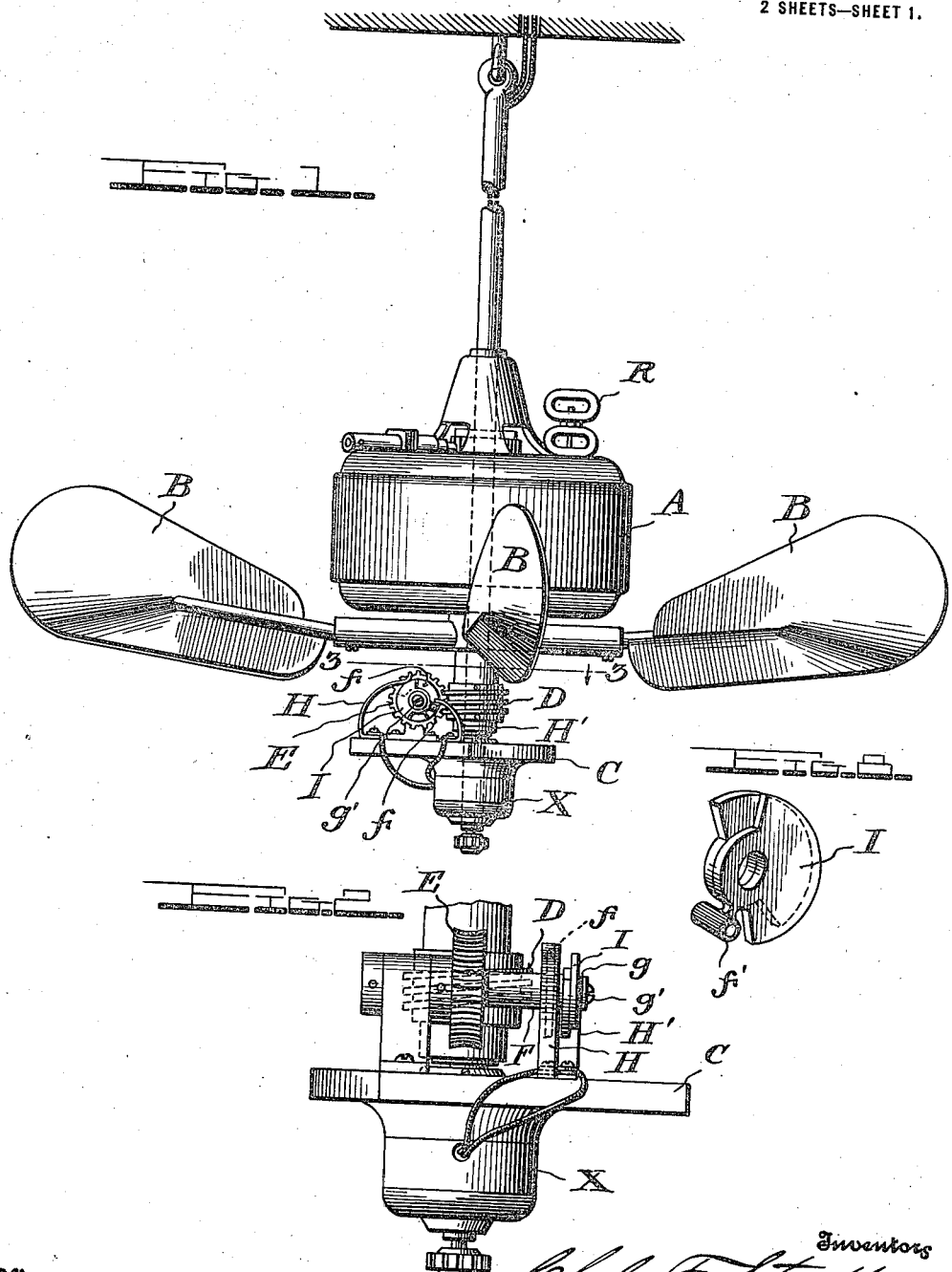

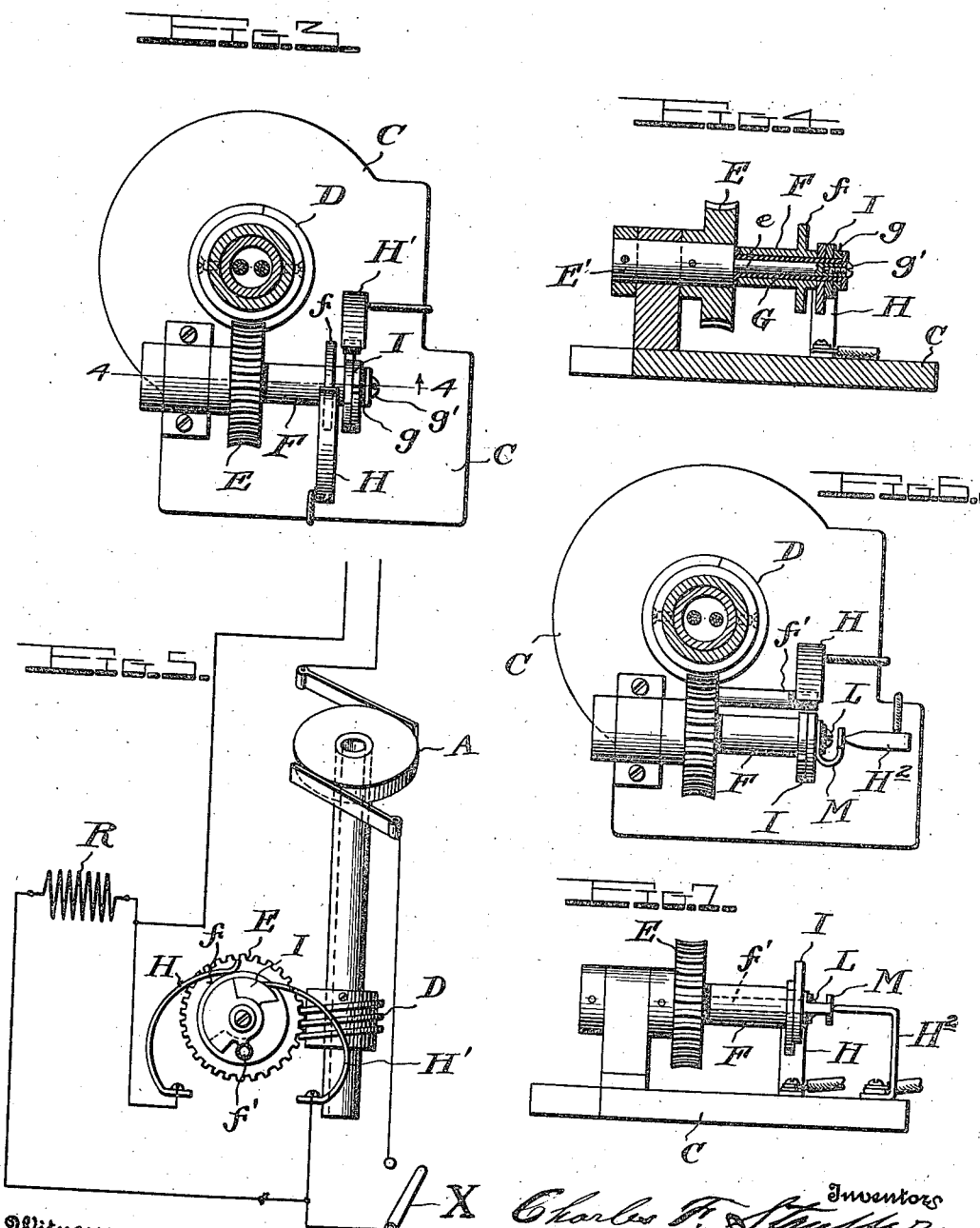

CHARLES F. STAUFFER, CHARLES P. BANZHOF, AND BENJAMIN GRANT STAUFFER, OF LANCASTER, PENNSYLVANIA, ASSIGNORS OF ONE-FOURTH TO SAID CHARLES F. STAUFFER, ONE-FOURTH TO SAID CHARLES P. BANZHOF, ONE-FOURTH TO SAID BENJAMIN G. STAUFFER, AND ONE-FOURTH TO LEVI W. HORTING, OF LANCASTER, PENNSYLVANIA.

ELECTRIC FAN.

1,150,313.   Specification of Letters Patent.   Patented Aug. 17, 1915.

Application filed August 24, 1914.   Serial No. 858,354.

*To all whom it may concern:*

Be it known that we, CHARLES F. STAUFFER, CHARLES P. BANZHOF, and BENJAMIN GRANT STAUFFER, citizens of the United States, residing at Lancaster, in the county of Lancaster and State of Pennsylvania, have invented certain new and useful Improvements in Electric Fans; and we hereby declare that the following is a full, clear, and exact description thereof, reference being had to the accompanying drawings, which form part of this specification.

This invention relates to power-driven fans used for causing a circulation of air, for ventilating and other purposes, and more particularly to electrically-operated fans adapted to create intermittent blasts or gusts of wind for the comfort of persons occupying a room in which there is little breeze or air stirring.

The primary object of the invention is to provide an improved fan adapted to create intermittent blasts or gusts instead of continuous blasts or currents, as in devices heretofore used for the same purpose, and to direct and distribute or spread the air currents or blasts over a larger area entirely covering the space below or confronting and surrounding the fan blades or paddles as well as radially or in the direction in which the blades extend.

Another object is to provide improved means for imparting a rapid rotary movement to the fan for a given period of time and then causing the fan to rotate slowly for another given period, and so on, for the purpose of creating intermittent blasts or gusts.

A further object is to provide means whereby the period of rapid rotation of the fan may be lengthened or shortened, at will, for varying the period of duration of the blasts.

The invention will first be hereinafter more particularly described, with reference to the accompanying drawings, which are to be taken as a part of this specification, and then pointed out in the claims at the end of the description.

In said drawings, Figure 1 represents a side elevation of an electrically-operated fan embodying our invention; Fig. 2 is a detail fragmentary view; Fig. 3 is a fragmentary detail sectional plan view taken on the line 3—3 of Fig. 1 looking downwardly, or in the direction of the arrow; Fig. 4 is a sectional view taken on the line 4—4 of Fig. 3; Fig. 5 is a diagrammatic view illustrating the electrical connections between the motor and a source of electric supply not shown; Fig. 6 is a fragmentary detail plan view illustrating a modification of the automatic switch or device for changing the path of the current so as to include a resistance for reducing the speed of the motor; Fig. 7 is a side elevation of said modification, and Fig. 8 is a detail.

Referring to said drawings, in which the same reference letters are used to denote corresponding parts in different views, the letter A may denote a suitable motor, preferably an electric motor suspended from the ceiling or other overhead support and having affixed to its armature shaft a number of radially extending paddles, vanes or blades B adapted to rotate with said shaft; said blades forming a fan of the propeller type though any suitable form may be employed, the form illustrated being a preferred construction; but no claim is made herein to the paddle or blade, *per se*, the specific construction shown being the invention of C. P. Banzhof, one of the joint applicants in the present case, and may form the subject of a sole application. The armature shaft may be tubular in form, as shown, and journaled in suitable bearings on the base or support C and within the motor casing, and extends a short distance below or beyond the rotary fan, between which and said base it carries a worm D, which engages a worm-wheel E on a stub-shaft E¹ which is mounted in bearings carried by the base-plate or support C, at the lower end of the armature shaft of the motor.

The stub-shaft is formed or provided with a reduced extension on which is placed an insulating sleeve G, and fitting on said sleeve is a metallic sleeve F which is formed or provided with a disk *f* which contacts with a brush H while a segmental plate I makes contact with a brush H¹ for a certain period of time, or until the stub-shaft has rotated sufficiently to permit the free end of the brush H¹ to become disengaged and break the electric circuit at that point;

the circuit being completed through the motor when the brush H¹ is in contact with the segment plate I. The electric connections through the motor are indicated diagrammatically in Fig. 5 of the drawings, wherein, as will be seen, the electric current passes from a suitable source of supply, not shown, through an insulated wire housed in the tubular armature shaft to the brush H, thence through the disk f and metallic sleeve F to the segment plate I and brush H¹ in contact therewith and through the circuit-breaking switch X back to the motor A, and out through another insulated wire housed in the tubular shaft of the motor. To adapt the fan to rotate slowly at intervals, when the circuit through the metallic sleeve F and brushes is broken a shunt or branch circuit is provided, as illustrated in Fig. 5, including a suitable resistance R, to be cut into the electric circuit when the brush H¹ is thrown out of contact with the segment plate I so that the current will pass through said resistance and around the circuit-breaking device to the switch X, and out, thus reducing the speed of the motor and causing the fan to produce only a gentle breeze. But when the circuit is reëstablished through the circuit-breaker the speed of the motor will be increased so as to impart a rapid rotary movement to the fan and thereby produce a blast or gust of wind.

The sleeve F, which may be of brass or other suitable metal, is secured upon the insulating sleeve or bushing G with its inner end abutting a shoulder on the inner end of said sleeve G, or other insulating means interposed between the sleeve G and stub-shaft E. The outer end of the sleeve F is in contact with the segment plate I, which is fitted on the sleeve G between the outer end of the sleeve F and an insulating disk or washer g on the outer end of the sleeve or bushing G, and the segment plate is secured on the end of the sleeve F with provision for adjustment by means of a set screw g¹ entering an interiorly threaded socket in the outer end of the reduced extension e of the stub-shaft, as will be presently described. Other means may be employed for securing said parts together, the arrangement shown being merely a convenient form. The segment-plate I, is preferably constructed in two parts, as shown, and the spring contact piece or brush H¹ has a wiping contact with its periphery until it reaches a point where the end of the brush is released whereupon the electric circuit is instantly broken and before the circuit is again closed the end of the brush will engage an insulated projection or stud f¹ on the segment (or which may project from the worm-wheel or other rotating part, as shown in Fig. 6) and when the stub-shaft has rotated sufficiently to release the brush H¹ from the insulated projection the brush will be quickly released and forced into engagement with the periphery of the segment-plate so as to avoid sparking.

In Figs. 6 and 7 of the drawings we have shown a modification of the automatic circuit breaker, or device for automatically cutting itself out of the electric circuit and cutting in the branch circuit including the resistance R, for the purpose of reducing the speed of the motor to cause the fan to rotate at a slow speed until the circuit is again closed through the circuit breaker, whereupon a rapid rotary movement will be imparted to the fan until the main circuit through the circuit breaker is again broken.

In the form shown in Figs. 6 and 7, instead of the disk on the sleeve F, with which the brush H² contacts, a resilient metallic plate M, preferably of U-shaped form, is secured on the sleeve G between the segment plate I and the insulating washer g and is securely fastened in place by the set screw L which secures the sleeve F and segment plate on the insulating bushing or sleeve G. The free end of the spring contact M is adapted to contact with the pointed end of a spring contact or brush H² fastened on the base plate or support C, instead of engaging the disk f on the sleeve F, as in the case of the contact spring H, to complete the circuit through the circuit breaker as previously described. The segment plate I may be an integral structure but is preferably constructed in two parts which are held in frictional contact by pressure exerted through the set screw L, so that one of the two parts may be adjusted relatively to the other by rotating it on the stub-shaft for the purpose of increasing or decreasing the period of time the circuit will be closed through the circuit breaker, and to this end the segment plate or plates is or are provided with an opening or openings through which the insulating sleeve G passes, so as to permit rotative movement of said parts for varying the duration of the period of contact between the segment plate and spring contact piece or brush and thereby correspondingly varying the period of rapid rotation of the fan.

In the illustrated embodiment of our invention we have shown an electric motor to the shaft of which a series of propeller fan blades are applied, the motor being suspended from a ceiling or other overhead support by a rod extending through the hollow shaft and supporting the base plate C, and the blades of the fan are so arranged that air currents will be directed downwardly or in a direction parallel with the axis of rotation, and air blasts or gusts radially or in the direction in which the blades extend; which construction and arrangement is desirable for use in hotels, public diningrooms, offices and private residences. But it will be understood, of course, that the invention may be embodied in various forms and applied to various uses other than those mentioned, and that other forms of motors and fans or fan blades of different types may be employed, and that the fan blades may be arranged in different positions, as desired, for the purpose of creating blasts or gusts of varying intensity and directing the blast either in a vertical or horizontal direction or in whatever direction the blades of the fan may extend.

The operation of the invention will be readily understood from the foregoing description, taken in connection with the accompanying drawings. When the electric circuit to the fan is closed by the ordinary type of switch, at X, the electrical current passes through the resistance coil R in series with the motor, causing said motor to operate at a slow rate of speed, and actuate the gear mechanism, which in turn actuates the switch or circuit breaker having a revolving contact engaging tension brushes, the off point having no influence upon the electric current introduced by the said common type of switch, but during the on period of contact the current is shunted directly around the said resistance, causing the motor driving the fan blades to revolve at a greater speed, the whole then producing intermittent blasts of air. The fan blades when driven by the motor operating at a slow speed do not produce a perceptible draft of air, but at the higher rate of speed produce a direct draft of air, the volume and distribution of which is controlled by the speed of the motor and the shape, number and size of the blades, paddles, vanes, or wings of the fan.

Having thus described our invention, what we claim as new and desire to secure by Letters Patent of the United States is:

1. In combination with a fan and a motor for imparting a rotary movement to the fan, means for varying the speed of the motor at intervals automatically so as to cause the motor to rotate rapidly for a given period of time and then slowly for another given period, to produce intermittent gusts of wind.

2. An electrically-operated fan comprising an electric motor and suitable electrical connections and a branch or shunt circuit including a resistance and means for cutting in and out said resistance at intervals to increase the speed of the motor and impart a rapid rotary movement to the fan when said resistance is cut out.

3. An electrically-operated fan comprising an electric motor and suitable electric connections including a resistance in said connections and means for automatically cutting in and out said resistance at intervals to increase the speed of the motor and impart a rapid rotary movement to the fan, together with means for varying the duration of the period of rapid rotation.

4. A motor-driven fan comprising a suitable motor, fan blades driven by said motor and means for automatically changing the speed of the motor at intervals so as to cause the fan blades to rotate rapidly for a given period of time and slowly for another given period.

5. A motor-driven fan comprising a suitable motor, fan-blades on the motor shaft, and means for automatically changing the speed of the motor at intervals so as to cause the fan-blades to rotate rapidly for a given period of time and slowly for another given period.

6. An electrically-operated fan comprising an electric motor suspended from an overhead support, electrical connections through said motor including a resistance, a switch and means for automatically cutting in and out said resistance at intervals, thereby changing the speed of the motor so as to cause the fan to rotate rapidly for a given period of time and slowly for another given period.

7. An electrically-operated fan comprising a motor, a fan driven by said motor, suitable electrical connections between said motor and a source of electric supply, including a resistance in a branch of said connections, a switch, and a circuit breaking device adapted to automatically cut in said resistance to reduce the speed of the motor for a given period and then cut out the resistance to increase the speed and produce gusts.

8. An electrically-operated fan comprising a motor, a fan driven by said motor, suitable electrical connections between said motor and a source of electric supply including a resistance in a branch of the circuit connections, a switch in said connections, and a device for automatically alternately cutting out and in said resistance, together with means for varying the periods of rapid and slow movement.

In testimony that we claim the foregoing as our own, we affix our signatures in presence of witnesses.

CHARLES F. STAUFFER.
CHARLES P. BANZHOF.
BENJAMIN GRANT STAUFFER.

Witnesses:
H. G. MILLER,
B. GRANT STAUFFER,
EDNA M. CHRIST.